United States Patent [19]

Boyer et al.

[11] Patent Number: 4,612,181

[45] Date of Patent: * Sep. 16, 1986

[54] METHOD OF PRODUCING CRYSTALLINE AMMONIUM METATUNGSTATE

[75] Inventors: Carl W. Boyer, Wyalusing; Donald H. Ennis, Towanda, both of Pa.

[73] Assignee: GTE Products Corporation, Stamford, Conn.

[*] Notice: The portion of the term of this patent subsequent to Sep. 16, 2003 has been disclaimed.

[21] Appl. No.: 704,842

[22] Filed: Feb. 25, 1985

[51] Int. Cl.$^4$ ............................................. C01G 41/00
[52] U.S. Cl. ..................................................... 423/593
[58] Field of Search ........................................ 423/593

[56] References Cited

U.S. PATENT DOCUMENTS

| | | | |
|---|---|---|---|
| 3,175,881 | 3/1965 | Chiola et al. | 423/593 |
| 3,956,474 | 5/1976 | Ritsko | 423/593 |
| 4,504,461 | 3/1985 | Carpenter et al. | 423/593 |

Primary Examiner—John Doll
Assistant Examiner—Wayne A. Langel
Attorney, Agent, or Firm—Donald R. Castle; L. Rita Quatrini

[57] ABSTRACT

A method is disclosed for producing crystalline ammonium metatungstate from ammonium paratungstate. The method involves heating the ammonium paratungstate in a multiple hearth furnace at from about 200° C. to about 400° C. to form a relatively uniformly heated ammonium paratungstate, followed by digesting the heated ammonium paratungstate in water to form an aqueous ammonium metatungstate solution. The digestion is carried out by adding the heated ammonium paratungstate to the water in separate portions, the addition of each portion being followed by heating the respective resulting mixture at from about 80° to about 100° C. for from about 5 to about 13 hours at relatively constant volume while maintaining the pH of the respective resulting mixture at from about 3.5 to about 4.5 by the addition of ammonia as necessary. The addition of the separate portions of the heated ammonium paratungstate is carried out until the concentration of the resulting aqueous ammonium metatungstate solution reaches about 260 grams of $WO_3$ per liter. The ammonium metatungstate solution is then evaporated to a fraction of its original volume to concentrate it, any insoluble material is separated from the solution, and the ammonium metatungstate is then crystallized from the concentrated solution.

3 Claims, No Drawings

METHOD OF PRODUCING CRYSTALLINE AMMONIUM METATUNGSTATE

FIELD OF THE INVENTION

This invention relates to any improved method for producing ammonium metatungstate. More particularly, it relates to a method for producing ammonium metatungstate in crystalline form using ammonium paratungstate as the starting material.

BACKGROUND OF THE INVENTION

Tungsten, generally in the form of tungsten oxide, $WO_3$, is useful as a component of a variety of catalysts for chemical reactions. In most cases in the manufacture of these catalysts it is necessary at some state to provide a water soluble tungsten compound from which the tungsten oxide is derived. For example, certain types of catalysts comprise porous carriers such as, for example, allumina impregnated with compounds of catalytic elements such as tungsten. In the preparation of such catalytic elements such as tungsten. In the preparation of such catalysts the carrier materials are immersed, or slurried, in solutions of the compounds of the catalytic elements and then dried, leaving the catalyst compound intimately associated with the carrier. Ammonium metatungstate, $(NH_4)_6H_2W_{12}O_{40}.xH_2O$ is a particularly useful solute in such solutions. It offers the advantages of being readily soluble in water and, in addition, it decomposes readily on heating to leave the desired catalyutic residue of tungsten oxide in the carrier. Alkali metal salts of the tungstates are also water soluble, but their use in catalyst manufacture is restricted by the fact that the presence of residual alkali metals frequently is objectionable in catalytic materials.

It has been proposed to obtain ammonium metatungstate solutions by baking crystalline ammonium paratungstate at temperatures of the order of 500° F. to drive off ammonia and to then dissolve the product of the baking operation in water. As is well known, a certain amount of ammonium metatungstate is produced by such a baking operation. However, thermogravimetric studies of this process have demonstrated that the ammonium paratungstate is not converted entirely to ammonium metatungstate at any particularly temperature, nor after any particular baking time. To the contrary, other degradation products, particularly insoluble tungsten oxide also are continuously formed during the baking. In addition, certain amounts of unconverted ammonium paratungstate remain. As a result, substantial amounts of insoluble tungsten oxide and also ammonium paratungstate, which is only slightly soluble, remain undissolved when it is attempted to dissolve the product of the baking operation making it necessary to filter the solution before use, and discard or reprocess the insoluble materials. Also, as indicated above, the small amount of paratungstate remaining in solution may complicate the use of the solution because of its tendency to precipitate out with temperature changes or evaporation of the water.

U.S. Pat. No. 3,591,331 discloses a process for producing ammonium metatungstate without an appreciable formation of ammonium paratungstate. The process comprises contacting an aqueous ammonium tungstate solution having a pH of at least about 9 with an organic extractant solution comprising di-2-ethylhexly phosphoric acid, and a water insoluble hydrocarbon solvent, the components being in specified ratios to extract ammonium ions from the aqueous solution, separating the resultant aqueous solution to a temperature of at least about 60° C. for at least 1 hour and recovering an essentially pure ammonium metatungstate.

U.S. Pat. No. 3,857,928 disclosure a process for producing crystalline ammonium metatungstate from ammonium tungstate solution by introducing the ammonium tungstate solution into an ion exchange column containing a weak acid (carboxylic group) cation exchange resin, and collecting the effluent from the column until a pH of about 3.5 is reached. The effluent solution is then digested at about 98° C. for about 5 hours, followed by crystallization of ammonium metatungstate by conventional processes, such as, evaporation or spray drying.

U.S. Pat. No. 3,857,929 discloses a process for producing crystalline ammonium metatungstate from ammonium tungstate solution by introducing a strong acid cation exchange resin containing sulphonic group batchwise into an ammonium tungstate solution until a pH of about 3.5 is reached. The resin is then removed by filtration and the filtered solution is digested at about 90° C. for at least about 5 hours, followed by crystallization of ammonium metatungstate by conventional processes, such as, evaporation or spray drying.

U.S. Pat. No. 3,956,474 discloses a process for producing ammonium metatungstate from ammonium tungstate which involves the addition of about 3.6 percent by weight of silica to an ammonium tungstate solution, digestion for at least about 4 hours at a temperature of at least about 98° C. followed by filtration to remove silica from the ammonium metatungstate solution. Typically about 0.4 percent by weight of silica remains after filtering. The resulting ammonium metatungstate solution may be further processed to recover solid ammonium metatungstate, such as by evaporation or spray drying.

U.S. Pat. No. 3,936,362 discloses a process for producing ammonium metatungstate and other species by passing tungstate ions through an anion exchange membrane into an aqueous solution containing ammonium cations under the driving force of an electrical potential for a time sufficient to achieve a pH within the range in which the desired tungsten compound will form.

U.S. Pat. No. 3,175,881 discloses a method for producing crystalline ammonium metatungstate from ammonium paratungstate by heating the ammonium paratungstate to the point at which a slurry containing about 9% by weight of material exhibits a pH of from about 3 to about 5, the heating time being generally from about 4 to about 8 hours, followed by evaporation of the slurry to about one-third of its original volume, filtering the concentrated slurry and then crystallizing ammonium metatugstate. Based on the $WO_3$ contents of the ammonium paratungstate starting material and the ammonium metatungstate produced, the yield is about 78.1%.

A method of producing crystalline ammonium metatungstate from ammonium paratungstate in higher yields than the above would be desirable.

SUMMARY OF THE INVENTION

In accordance with one aspect of this invention, there is provided a method of producing crystalline ammonium metatungstate from ammonium paratungstate. The method involves first heating the ammonium paratungstate in a multiply hearth furnace at from about 200° C. to about 400° C. to form a relatively uniformly heated ammonium paratungstate, followed by digesting the heated ammonium paratungstate in water to form an aqueous ammonium metatungstate solution. The digestion is carried out by adding the heated ammonium paratungstate to the water in separate portions, the addition of each portion being followed by heating the respective resulting mixture at from about 80° C. to about 100° C. for from about 5 hours to about 13 hours at relatively constant volume while maintaining the pH of the respective resulting mixture at from about 3.5 to about 4.5 by the addition of ammonia as necessary. The addition of the separate portions of the heated ammonim paratungstate is carried out until the concentration of the resulting aqueous ammonium metatungstate solution reaches about 260 grams of $WO_3$ per liter. The ammonium metatungstate solution is then evaporated to a fraction of its orginal volume to concentrate it, any insoluble material is separated from the solution, and the ammonium metatungstate is then crystallized from the concentrated solution.

DETAILED DESCRIPTION OF THE INVENTION

For a better understanding of the present invention, together with other and further objects, advantages, and capabilities thereof, reference is made to the following disclosure and appended claims in connection with the foregoing description of some of the aspects of the invention.

By the process of this invention, crystalline ammonium metatungstate is produced from ammonium paratungstate in high yields.

Commercially available ammonium paratungstate which has the generally accepted formula $(NH_4)_{10}OH_2W_{12}O_{41}\cdot xH_2O$ is first heated or calcined in a multiple hearth furnace to drive off ammonia and water vapor and form a relatively uniform heated ammonium paratungstate.

By the process described in U.S. Pat. No. 3,175,188, it was believed that ammonium metatungstate which has the formula $(NH_4)_6H_2W_{12}O_{40}\cdot H_2O$ could be produced by driving off the proper amount of ammonia and water which would be generally from about 5% to about 7%, the variation being due to the varying amounts of waters of hydration in the ammonium paratungstate. Therefore, the temperature and time of heating were designed to achieve weight losses in this range. However, the overall yield of ammonium metatungstate obtained by the process of this patent is only from about 75% to about 85%. It is now believed that the calcining conditions actually resulted in formation of insoluble material which was one of the major causes of the relatively low yield. The insolubles can be (1) heteropoly compounds of tungsten which are tungsten compounds containing arsenic, phosphorus, or silicon, (2) ammonia deficient species as tungsten oxide which result from overcalcining and therefore excessive losses of ammonia, and/or presence of difficulty soluble ammonium paratungstate which results due to insufficient heating in the calcining operation. The latter two types especially can form as a result of uneven heating of the ammonium paratungstate which results in both over calcining and undercalcining in the same batch. The calcining operation is generally carried out by heating the material in batches in trays or the material is continuously fed through a rotary type of kiln. The preferred method according to U.S. Pat. No. 3,175,881 is in a continuous rotary calciner.

The present invention discloses use of a multiple hearth furnace to uniformly heat the ammonium paratungstate in order to prevent formation of excessive insolubles which result from overheating or underheating. The result is an increase in the overall yield of ammonium metatungstate.

A multiple hearth furnace which can be used in the operation of this invention, is a plate dryer which is a continuously operating contact dryer suitable for handling free-flowing, non-caking, trickling, powdery, or granular products. It consists of a number of drying plates placed one above the other and spaced apart. Its specific characteristics are the mechanical product conveying and the low velocity of purging gases and/or vapors which avoids excessive dust formation and permits the handling of very fine products and those with a wide particle distribution. Plate dryers manufactured by Krauss Maffei are especially suitable. In general, the plate dryer operates by allowing the moist product to trickle from a feed mechanism such as a bucket wheel, etc. onto the top plate. The rotating raking system which consists of rakes postioned on each plate, conveys the drying product in a spiralic pattern through several revolutions to and over the outer rim of the first plate. Here the product trickles to the next plate below, where it is conveyed to the center of the plate in the same manner as before. The transportation operation repeats itself according to the number of plates. During its contact with the heated plate surface, the product is drying. The vapors are exhausted or discharged by purging gases (air or inert gas) flowing transversely across the plates. Each plate can be heated individually, thus allowing a temperature profile exactly suited to the product and process. Heating media are steam, hot water, or heat transfer fluids.

Another type of multiple hearth furnace is the Turbo Dryer in particular, one manufactured by Wyssmont, of Fort Lee, N.J. The Turbo Dryer has only two moving parts, the tray/shelf assembly and the fan assembly. Wet feed enters the dryer through a feed chute in the roof of the housing and flows onto the first shelf. The shelves are circular with cut out center and radial slots. The shelves are rigidly mounted on an inner supporting frame forming a vertical stack which rotates slowly as a unit. Material flows onto each shelf from the one above, forming a pile. The rotation of the tray/shelf assembly carries the freshly formed pile past a statiionary blade set to level the pile to fill the tray at a uniform height. At the end of a revolution, the tray segment meets a second stationary blade set to wipe the tray clean of material. The material is held stationary by the wiper blade while the tray continues its rotation. The material flows through the radial slot on the shelf below where the cycle is repeated. Material progresses downward from shelf to shelf through the dryer and is discharged through a chute in the housing bottom. Air or other drying medium is fed to the dryer through a side mounted vertical manifold with control dampers. Air movement inside the dryer is provided by centrifugal fans mounted on a single vertical shaft. The fan assembly fits in the center of the shelf assembly and rotates independently of the shelves. The drying medium leaves the dryer through a roof exhaust.

While very specific multi hearth furnaces have been just described, it is to be understood that any multiple hearth or stage type of furnace or dryer can be used to accomplish uniform heating of the ammonium paratungstate.

The heating conditions as temperature, residence time, bed depth, number of stages or hearths, etc., can vary depending on the particular furnace or dryer being used. However, in general heating temperatures are from about 200° C. to about 408° C. with from about 260° C. to about 370° C. being preferred. The material bed depth is maintained generally from about ½ inches to about 2½ with from about ¾ inches to about 1½ inches being preferred. The bed of material is gently, and continuously agitated. The flow of heated air through the furnace is closely regulated to from about ¾ to about 2 cubic feet of air per pound of ammonium paratungstate. The residence time, of course varies with the above conditions. The heating conditions are designed to give a weight loss of from about 5.5% to about 7.5%. In this range of weight loss, there are less ammonia deficient species formed and therefore less insolubles.

The heated ammonium paratungstate is then digested in water to form an aqueous ammonium metatungstate solution and some insoluble material. The digestion is carried out by adding the heated ammonium paratungstate to the water in separate portions, the addition of each portion being followed by heating the respective resulting mixture at from about 80° C. to about 100° C., preferably at from about 85° C. to about 95° C. for from about 5 to about 13 hours at relatively constant volume, while maintaining the pH of the respective mixture at from about 3.5 to about 4.5 by adding ammonia or ammonium hydroxide as necessary. The addition of the separate portions of the heated ammonium paratungstate is carried out until the concentration of the aqueous ammonium metatungstate solution reaches about 260 grams of $WO_3$ per liter. The initial temperature of the water, preferably deionized water, before any ammonium paratungstate is added to it is preferable from about 80° C. to about 95° C. Typically the heating time increases with the addition of successive portions of the ammonium paratungstate. For example, after the first portion is added, the resulting mixture is heated after the first portion is added, the resulting mixture is heated for about 5 hours to about 7 hours; after the second portion is added, the resulting mixture is heated for about 7 hours to about 9 hours; after the third portion is added, the resulting mixture is heated for from about 9 hours to about 11 hours; and after the fourth portion is added, the resulting mixture is heated for from about 11 hours to about 13 hours. This technique of adding successive portions of heated ammonium paratungstate to the digestion mixture allows for greater quantities of material to be converted to ammonium metatungstate more efficiently than if the charge of ammonium paratungstate is added all at once.

It is critical that the material be digested at the proper conditions of time and temperature to allow the conversion to the ammonium metatungstate structure. Generally in this particular process from about 6 to about 13 hours of digestion are required for each portion of ammonium paratungstate charge at temperatures of from about 80° C. to about 100° C. for this conversion to take place efficiently. These digestion conditions are not taught in U.S. Pat. No. 3,175,188. For proper conversion, it is also critical that the pH range be maintained at from about 3.5 to about 4.5. During the digestion process there can be some loss of ammonia, resulting in a drop in pH. Therefore, ammonia or ammonium hydroxide can be added to maintain the pH in the proper range.

As a result of the digestion, an aqueous solution of ammonium metatungstate is formed. There can also be some insoluble material present due to impurities, or some tungstic oxide, but this amount is very small.

The solution is then evaporated to a fraction, preferably about one-third of its original volume to concentrate the ammonium metatungstate. An open kettle is suitable for this purpose.

Any insoluble material is then separated from the concentrated ammonium metatungstate solution by any standard technique such as filtration.

Crystalline ammonium metatungstate can then be recovered from the concentrated solution by any conventional manner such as by evaporation or by spray drying.

Based on the $WO_3$ content of the starting ammonium paratungstate and the ammonium metatungstate produced, the yield is at least about 95%.

To more fully illustrate this invention, the following non-limiting example is presented. All parts, portions, and percentages are on a weight basis unless otherwise stated.

About 400 parts of ammonium paratungstate which was heated in a Wyssmont dryer is digested in about 1450 parts of deionized water according to the following procedure. The water is heated to about 90° C. About 100 parts of the heated ammonium paratungstate is then added and the resulting mixture is digested for about 6 hours at relatively constant volume. About 100 parts of the heated ammonium paratungstate is then added to this digestion mixture and the resulting mixture is digested for about 8 hours at relatively constant volume. After the eight hour digestion, about 100 parts of heated ammonium paratungstate is added to the digestion mixture and the resulting mixture is digested for about 10 hours at relatively constant volume. After the 10 hour digestion, about 100 parts of heated ammonium paratungstate is added to the digestion mixture and the resulting mixture is digested for about 12 hours at relatively constant volume. The temperature is maintained at from about 85° C. to about 95° C. throughout the digestion process. After the 12 hours digestion, the resulting digestion mixture is concentrated. The insolubles are filtered off. About 96% of the $WO_3$ which was in the starting ammonium paratungstate is recovered in solution such as ammonium metatungstate.

While there has been shown and described what are at present considered the preferred emodiments of the invention, it will be obvious to those skilled in the art that various changes and modifications may be made therein without departing from the scope of the invention as defined by the appended claims.

What is claimed is:

1. A method of producing crystalline ammonium metatungstate from ammonium paratungstate, said method comprising:
   (a) heating said ammonium paratungstate in a multiple hearth furnace at from 200° C. to about 400° C. to form a relatively uniformly heated ammonium paratungstate;
   (b) digesting said heated ammonium paratungstate in water to form an aqueous ammonium metatungstate solution, the digestion being carried out by adding said heated ammonium paratungstate to the water in separate portions, the addition of each portion being followed by heating the respective resulting mixture at from about 80° C. to about 100° C. for from about 5 hours to about 13 hours at relatively constant volume while maintaining the pH of the respective resulting mixture at from about 3.5 to about 4.5 by the addition of ammonia as necessary, the addition of said separate portions of heated ammonium paratungstate being carried out until the concentration of said aqueous ammonium metatungstate solution reaches about 260 grams of $WO_3$ per liter;

(c) evaporating said aqueous ammonium metatungstate solution to a fraction of its original volume to form a relatively concentrated ammonium metatungstate solution;

(d) separating any insoluble material from said concentrated ammonium metatungstate solution; and (e) crystallizing ammonium metatungstate from said concentrated ammonium metatungstate solution.

2. A method according to claim 1 wherein said ammonium paratungstate is maintained in said multiple hearth furnace at a depth of from about ½ to about 2½ inches.

3. A method according to claim 1 wherein at least about 95% by weight of tungsten in said ammonium paratungstate is converted to ammonium metatungstate.

* * * * *